United States Patent [19]

Nasrallah et al.

[11] Patent Number: 4,772,445
[45] Date of Patent: Sep. 20, 1988

[54] SYSTEM FOR DETERMINING DC DRIFT AND NOISE LEVEL USING PARITY-SPACE VALIDATION

[75] Inventors: Chaoukat N. Nasrallah, Export; Kingsley F. Graham, Murrysville, both of Pa.

[73] Assignee: Electric Power Research Institute, Palo Alto, Calif.

[21] Appl. No.: 812,202

[22] Filed: Dec. 23, 1985

[51] Int. Cl.⁴ .......................... G21C 7/36; G01S 3/80; G05B 9/02
[52] U.S. Cl. ................................ 376/245; 367/124; 367/126; 318/563; 318/564; 371/67; 371/68; 371/64; 364/571.01; 376/217
[58] Field of Search ................ 367/124, 126; 318/563, 318/564; 371/67, 68, 64; 364/571; 376/215, 216, 217, 245

[56] References Cited

U.S. PATENT DOCUMENTS

| | | |
|---|---|---|
| 3,568,150 | 3/1971 | Games . |
| 3,667,057 | 5/1972 | Pfersch, Jr. et al. ................ 371/67 |
| 3,764,467 | 10/1973 | Erp . |
| 3,770,948 | 11/1973 | Caputo et al. ........................ 371/68 |
| 3,881,670 | 5/1975 | Doniger ................................ 371/14 |
| 4,105,496 | 8/1978 | Therond . |
| 4,223,681 | 9/1980 | Sherman . |
| 4,276,648 | 6/1981 | Tomlinson .......................... 371/68 |
| 4,327,437 | 4/1982 | Gelderloos ......................... 318/564 |
| 4,346,363 | 8/1982 | Wilhelmson ......................... 324/94 |
| 4,433,414 | 2/1984 | Carey . |
| 4,472,806 | 8/1984 | Blair . |
| 4,497,059 | 1/1985 | Smith .................................. 371/68 |
| 4,594,714 | 6/1986 | Fischer et al. ...................... 371/68 |
| 4,625,314 | 11/1986 | Witte .................................. 371/68 |
| 4,654,582 | 3/1987 | Ito ...................................... 371/68 |
| 4,667,284 | 5/1987 | Asami ................................. 371/68 |

FOREIGN PATENT DOCUMENTS 2636352 2/1978 Fed. Rep. of Germany ........ 371/68

OTHER PUBLICATIONS

Potter and Suman, "Thresholdless Redundancy Management with Arrays of Skewed Instruments," Integrity in Electronic Flight Control Systems, NATO AGARDOGRAPH-224, 1977, pp. 15-1 to 15-25.

Deckert et al., "On Line Power Plant Signal Validation Technique Utilizing Parity-Space Representation and Analytic Redundancy," Electric Power Research Institute, Final Report of Research Project 1541, Nov. 19, 1981.

*Primary Examiner*—Thomas H. Tarcza
*Assistant Examiner*—David Cain
*Attorney, Agent, or Firm*—D. C. Abeles

[57] ABSTRACT

A system which measures direct current drift and noise in sensor signals from redundant sensors utilizing a parity-space algorithm. Parity vector signals produced by the parity-space algorithm are averaged to provide a direct current (DC) drift signal. An instantaneous noise signal is found by subtracting the direct current drift signal from a parity vector signal for one of the samples of the sensor signals. The RMS value of the instantaneous noise signals are averaged to provide sensors noise signals.

13 Claims, 5 Drawing Sheets

SYSTEM FOR DETERMINING DC DRIFT AND NOISE LEVEL USING PARITY-SPACE VALIDATION

BACKGROUND OF THE INVENTION

1. Field of the Invention

The present invention relates in general to signal validation systems, and more specifically to a signal validation system in the control system of a nuclear reactor; the signal validation system being capable of determining direct current (DC) drift and noise components in signal discrepancies.

2. Description of the Related Art

Reliability is an important consideration in many areas of technology, such as advanced avionic systems and the control systems of nuclear reactors. The use of redundant components, at least two, and more typically three or four components, is one technique that is used to increase reliability. The advantage of redundant components is that when a failure of one of the components is detected, the remaining component(s) which produce signals conveying the same information can still be used. Thus, system reliability becomes a function of the ability to identify and handle component failures.

In the case of signals output by sensors, several types of failures are possible, including: bias—due to D.C. drift or noise, hardover—to a maximum or minimum level; sticking—at a given level; or common mode—where more than one sensor fails in the same manner, more or less simultaneously. In the case of sensors which output positive and negative values corresponding to the maximum and minimum values of a hardover error, null failure, resulting in the output of a zero value, is also possible.

A powerful tool for identifying many types of failures while requiring relatively little variation for specific control systems, is provided by the parity-space algorithm. The parity-space algorithm was originally developed for advanced avionic systems as described in Potter and Suman, "Thresholdless Redundancy Management with Arrays of Skewed Instruments," *Integrity in Electronic Flight Control Systems*, NATO AGARDO-GRAPH-224, 1977, pages 15-1 to 15-25 incorporated by reference herein. The application of the parity-space algorithm to control of nuclear reactors is described in a report available from the Electric Power Research Institute, Inc. as the Final Report dated Nov. 19, 1981 of NP-2110, Research Project 1541, by Deckert et al., entitled On-line Power Plant Signal Validation Technique Utilizing Parity-Space Representation and Analytic Redundancy incorporated by reference herein. As described therein, application of the parity-space algorithm to a specific system only requires determination of an error boundary for each sensor in the system.

The parity-space algorithm provides information concerning discrepancies between redundant measurements of a parameter. Rather than comparing the measurements against a reference value, the parity-space algorithm looks at the differences between the values. As a result, the number of dimensions q of a parity vector generated by the parity-space algorithm is equal to the number of measurements of a parameter minus the dimensions of the parameter. For example, according to the parity-space algorithm, l measurements of a scalar parameter produce a parity vector having $q = l - 1$ dimensions.

One particular type of parity space has been termed "orthogonal parity space" by Potter and Suman in their article referenced above. As defined therein, orthogonal parity space has the following properties. An orthogonal parity vector $\hat{p}$ is defined according to equation (1), where V is an upper triangular matrix that transforms l measurements in an l by 1 column vector m into the parity vector $\hat{p}$.

$$\hat{p} = Vm \qquad (1)$$

The measurement vector m is defined according to equation (2), where x is the actual value of the parameter being measured and has n dimensions where n equals 1 if the parameter being measured is a scaler, $\epsilon$ is the error in each of the measurements, and H is an l by n matrix.

$$m = Hx + \epsilon \qquad (2)$$

Thus, when a scalar is measured by three sensors, H is defined by equation (3).

$$H = \begin{bmatrix} 1 \\ 1 \\ 1 \end{bmatrix} \qquad (3)$$

In orthogonal parity space, matrix V is defined to have the properties of equation (5) where matrix K is defined as in equation (4).

$$K = (H^T H)^{-1} H^T \qquad (4)$$

$$V^T V = I - HK = W \qquad (5)$$

From equation (5) it follows that equations (6) and (7) are true.

$$VV^T = KH = I \qquad (6)$$

$$VH = KV^T = 0 \qquad (7)$$

Given the above characteristics of matrix V, Potter and Suman have found that the elements of the matrix V are defined by equations (8)–(12).

$$V_{11}^2 = W_{11} \qquad (8)$$

$$V_{ij} = 0, \text{ for } j < i \qquad (9)$$

$$V_{1j} = W_{1j}/V_{11}, \text{ for } j = 2, \ldots, l \qquad (10)$$

$$V_{ii}^2 = W_{ii} - \sum_{k=1}^{i-1} V_{ki}^2, \text{ for } i = 2, \ldots, q \qquad (11)$$

$$V_{ij} = \left( W_{ij} - \sum_{k=1}^{i-1} V_{ki} V_{kj} \right) / V_{ii}, \qquad (12)$$

for $i = 2, \ldots, q$ and $j = i + 1, \ldots, l$

The simplest application of the parity-space algorithm in orthogonal parity space occurs when a scalar parameter ($n = 1$) is measured by three sensors ($l = 3$). In this case, the matrix H is defined by equation (3) and, as defined in equation (4), $K = \frac{1}{3}[1,1,1]$. Using the definition in equation (5), the elements of matrix W have the values in equation (13).

$$W = (\tfrac{1}{3})\begin{bmatrix} 2 & -1 & -1 \\ -1 & 2 & -1 \\ -1 & -1 & 2 \end{bmatrix} \quad (13)$$

The formulas in equation (8)–(12) give the following results for matrix V.

$$V = \begin{bmatrix} \sqrt{\tfrac{2}{3}} & -1/\sqrt{6} & -1/\sqrt{6} \\ 0 & 1/\sqrt{2} & -1/\sqrt{2} \end{bmatrix} \quad (14)$$

The columns of matrix V are vectors of length $\sqrt{\tfrac{2}{3}}$ which lie along the measurement axes in parity space. Plotting these vectors results in a positively valued measurement axis every 120°, as illustrated in FIG. 1.

As a result of the special properties of orthogonal parity space, several meaningful values can be found using a minimum amount of calculation when the parameter being measured is a scalar. A residual $\eta_j$ can be found for each of the measurements $m_j$ by subtracting the mean $\overline{m}$ from each measurement $m_j$, i.e., $\eta_j = m_j - \overline{m}$, where $\overline{m}$ is calculated according to equation (15).

$$\overline{m} = \frac{1}{l} \sum_{i=1}^{l} m_i \quad (15)$$

The residuals can then be reordered from smallest to largest, as indicated in equation (16).

$$\eta_1 \leq \eta_2 \leq \ldots \leq \eta_l \quad (16)$$

After the reordering, there is a one-to-one correspondence between the measurements $m_j$ and the residuals $\eta_j$, but the residual $\eta_2$, for example, is not necessarily the residual for the measurement $m_2$. After such reordering, a projection $p_j$ of the parity vector along the measurement axis of each sensor j can be can be calculated according to equation (17).

$$p_j = \sqrt{l/(l-1)} \cdot \eta_j \quad (17)$$

Given measurements from three sensors, for example, the parity vector 10 will be two-dimensional and thus easily depicted on a display screen 20, as illustrated in FIG. 1. In the case of such a two-dimensional parity vector 10, it is relatively easy to convert the projection $p_j$ into two-dimensional component parity vectors (the coordinates of the parity vector in the plane), or into sensor components of the parity vector in the direction of the measurement axes, using appropriate geometric and trigonometric relationships. An example of conversion will be given in the Description of the Preferred Embodiment.

Failure of any one of the sensors can be detected by analyzing the parity vector. When the sensors are assumed to have a uniform error boundary b, at least one of the sensors is in error if the inequality (18) is satisfied, where $\delta_a$ is defined by equations (19a) and (19b).

$$\sum_{i=1}^{l} \eta_i^2 > \delta_a \quad (18)$$

$$\delta_a = a \cdot b^2, \text{ when } a \text{ is even} \quad (19a)$$

-continued
$$\delta_a = (a^2 - 1) \cdot b^2/a, \text{ when } a \text{ is odd} \quad (19b)$$

In many cases, it is possible to identify which of the sensors has failed by calculating orthogonal components $$p_{\perp j}^2$$

in accordance with equation (20) for each of the sensors.

$$p_{\perp j}^2 = \sum_{i=1}^{l} \eta_i^2 - \left(\frac{l}{l-1}\right)\eta_j^2 \quad (20)$$

Since the residuals $\eta_j$ were ordered according to equation (16) above, the orthogonal component $$p_{\perp 1}^2$$

will have the largest value of any of the orthogonal components. Therefore, if the orthogonal component $$p_{\perp j}^2$$

is small, i.e., the inequality in equation (21), where $\delta_{l-1}$ is defined by equations (19a) and (19b), is true for $j=1$, then no inconsistency has been detected in the measurements supplied by the sensors and the value of the parameter measured by the sensors can be estimated as the mean m.

$$p_{\perp j}^2 \leq \delta_l - 1 \quad (21)$$

If the inequality in equation (21) is not satisfied for $j=1$, then the inequality is tested repeatedly for each value of $j=2$ through $j=l$. As j gets larger, the value of $p_j^2$ will get smaller. If the inequality in equation (7) is satisfied for a value of j between 2 and $l-1$, inclusive, then the sensor which produced the inconsistency cannot be positively identified, and the best estimate for the value of the parameter measured by the sensors is m, where m is defined by equation (22).

$$\hat{m} = \frac{1}{(j-1)} \sum_{i=1}^{j-1} m_i \quad (22)$$

If the first value of j which satisfies the inequality in equation (21) is l, then the sensor which generated the residual $\eta_l$ can be identified as having produced the inconsistent measurement and equation (22), with $j=l$, can be used for the best estimate m of the value of the parameter measured by the sensors.

If none of the measurements can be identified as having been inconsistent, then the above procedure is repeated, throwing out the measurement which generated the largest residual $\eta_l$. This is equivalent to decrementing the value of l by 1 and repeating equations (15) through (22). However, if the value of l is decremented below three, i.e., only two measurements are left, without isolating an inconsistent measurement, it is impossible to isolate the inconsistent measurement using the conventional parity-space algorithm.

Assuming this does not occur, when the equation in (21) is satisfied and the value of the decremented l is at least three, then the estimate m for the value of the parameter measured by the sensors can be calculated according to equation (22). However, if the value of j which satisfies the inequality in equation (21) equals the value of the decremented l, it is necessary to compare the measurements of the excluded sensors with the measurement of the sensor having the orthogonal component $$p^2_{1,j}$$

which satisfied equation (21) to determine whether the difference therebetween is less than the error-bound b. In other words, if the inequality in equation (23) is true for any value of k greater than the value of j and less than or equal to the original value of l, where the value of j equals the value of the decremented l, then a common mode inconsistency has occurred which the parity-space algorithm is unable to isolate.

$$|m_k - m_j| \leq 2b \qquad (23)$$

When a sensor is identified as having generated consecutive inconsistent measurements, for example, three times, then that sensor is identified as having failed.

As described above, although the basic parity-space algorithm is extremely powerful, it has limitations with respect to the types of failures which are detected. For example, a sensor may have a significant amount of DC drift, e.g., due to poor calibration, without having actually failed. Since the parameter-space algorithm does not distinguish between noise and DC drift contributions to inconsistent measurements, the information which could be provided by analysis of these components is not utilized.

SUMMARY OF THE INVENTION

An object of the present invention is to provide a system for determining direct current drift and noise levels in redundant sensors using parity-space signal validation.

A further object of the present invention is to identify one or more failed sensors in situations in which parity-space signal validation is unable to identify a failed sensor.

Another object of the present invention is to provide a direct current drift signal for each sensor in a system utilizing redundant sensors to permit remote calibration of the sensors.

The above mentioned objects are attained by utilizing a method of measuring direct current drift and noise in samples of sensor signals received from corresponding sensors, including the step of converting the samples of the sensor signals into parity vector signals, each of the parity vector signals representing inconsistancy among a corresponding sample of the sensor signals. The method also includes the steps of converting the parity vector signals into a direct current drift signal by producing a first running average of the parity vector signals and producing an instantaneous noise signal for a corresponding parity vector signal by subtracting the direct current drift signal from the corresponding parity vector signal.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENT

Figure 1:
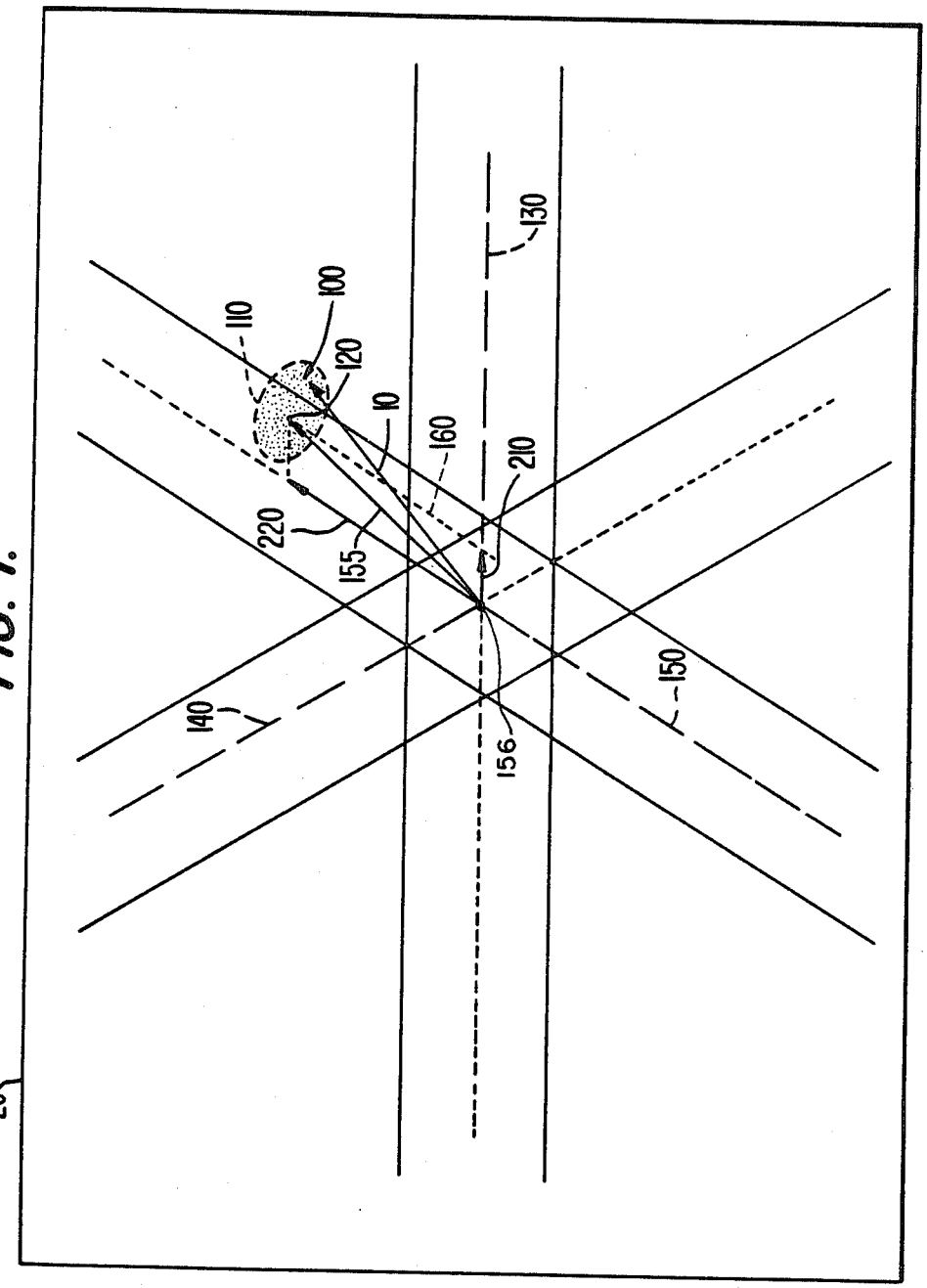
FIG. 1 is a planar representation of parity space illustrating calculation of DC drift.

Conventionally, control systems utilize sensors 30 (FIG. 2) to measure critical variables in a system controlled by a control system 35. The system being controlled may be in an aircraft or spacecraft, a chemical manufacturing plant, etc. The present invention can be applied to any such system, but will be described below for sensors 30 in a pressurized light water nuclear reactor. The sensors 30 provide sensor signals via lines 40 to an analog/digital converter 45, such as the A/D converter on an Intel 88/40 single board computer which can provide some preprocessing. Even using the best shielding available, the sensor signals received by the analog/digital converter 45 will contain some amount of noise since the sensors typically see process noise in the parameter they are monitoring. An example is steam generation level noise caused by the boiling in the steam generator. In addition, the sensor signals may contain direct current (DC) drift due to: poor initial calibration of the sensors 30, drifting of the sensors 30 during operation or failure of the sensors 30.

The present invention identifies DC drift and noise signals present in the sensor signals by analyzing digitized sensor signals output by the analog/digital converter 45 in a processor 50, such as an Intel 86/05. The results of the analysis can be displayed on an auxiliary display 55 or used to control the nuclear reactor control system 35 after conversion to analog signals in a digital/analog converter 60.

The first step in measuring direct current drift and noise according to the present invention is to generate component parity vector signals as described above with reference to equations (1) through (17). As illustrated in FIG. 1, the parity vectors define coordinates 100 that may be limited by an envelope 110 which defines the limit of the noise seen by a long sequence of measurements. Averaging the coordinates 100 over time produces a centroid 120 which corresponds to composite direct current drift, since the effects of noise will be averaged out. The centroid 120 can be calculated using standard matrix arithmetic.

Given the coordinates of the centroid 120, it is possible to generate sensor direct current drift signals in the direction of the q or (1−1) measurement axes 130, 140 and 150 corresponding to sensors #1, #2 and #3, respectively. Since, as described above, the parity vector has 1−1 dimensions when there are 1 sensors, the maximum number of constituent sensors corresponding to the sensor direct current drift signals is 1−1. An example will be given below for l equals three, since the resulting parity vector will have two dimensions and can be easily illustrated. However, the number of sensors which can be handled by the present invention is not limited to three. If only two sensors are available, it may be possible to calculate one or more estimated sensor signals by assuming certain relationships between other measured parameters and the parameter being measured by the two remaining sensors (see the EPRI report on Research Project 1541 referenced above).

One method for identifying the constituent sensors is to consider equations (16) and (17). Since the direct current drift signal is simply an average parity vector signal, if an average residual $\overline{\eta}_j$ is kept for each of the sensors, the sensor producing the smallest average residual $\overline{\eta}_1$ will produce the smallest projection $p_1$ according to equation (17). In other words, the sensor producing the smallest average residual $\overline{\eta}_1$ contributes the least to the DC drift signal and is, therfore, not a constituent sensor.

The first method of identifiying constituent sensors may be better understood in view of a second method for identifying the contituent sensors of the DC drift signal. The second method is most easily explained by considering the graphical representation of two-dimensional parity. In the case of a two-dimensional composite DC drift signal or vector 155, defined by the centroid 120 and the origin 156, there are at most two constituent sensors which may have corresponding component DC drift signals. The constituent sensors can be identified by the angle between the vector 155 and a given measurement axis.

Figure 3:
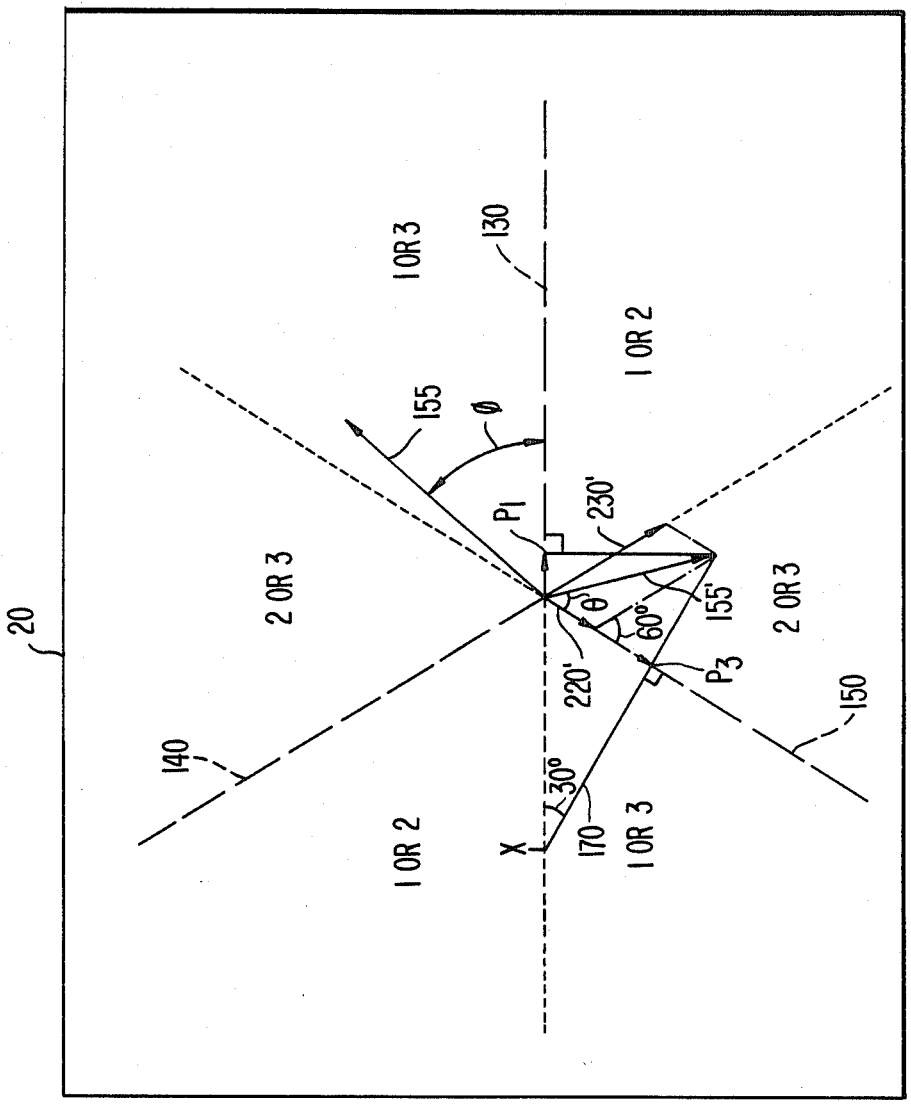
FIG. 3 is a planar representation of parity space illustrating calculation of sensor DC drift vectors.
Figure 4:
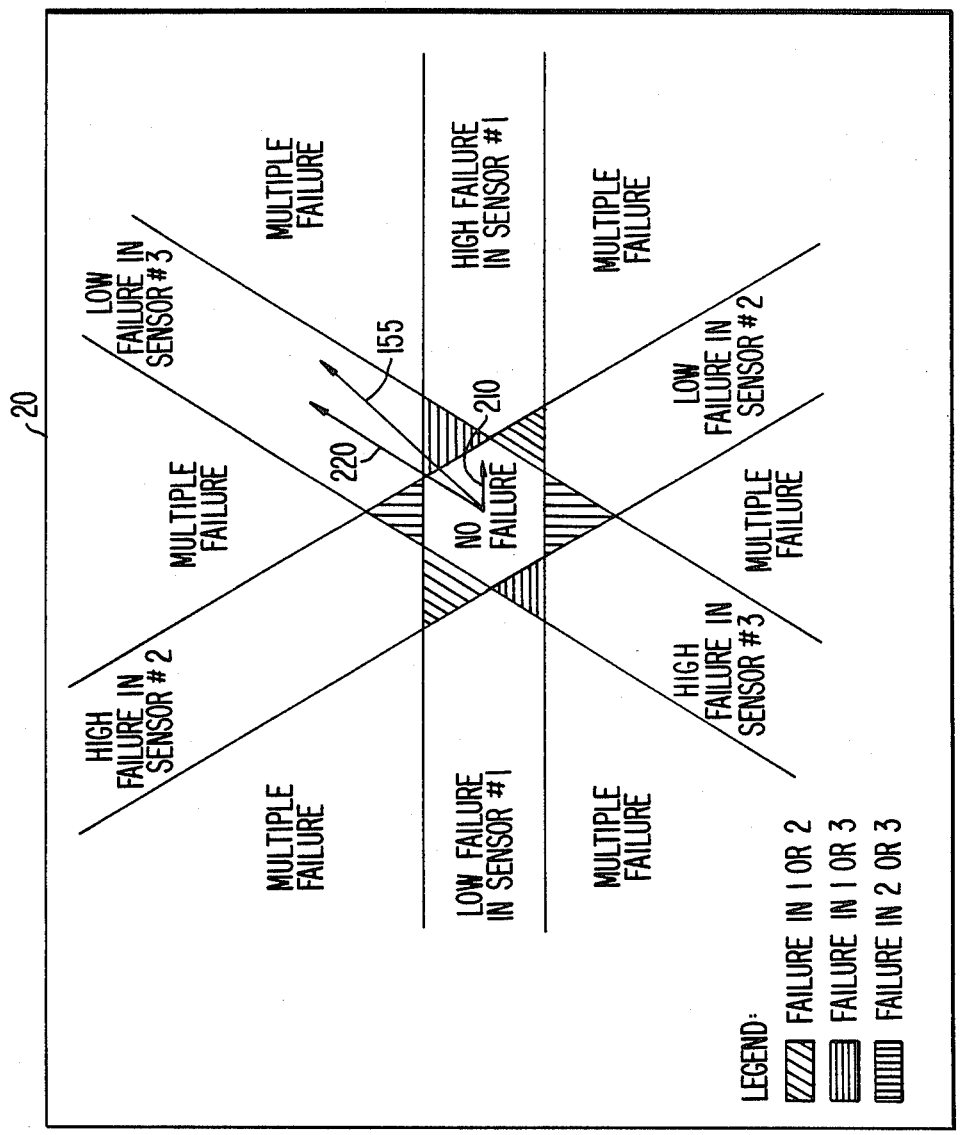
FIG. 4 is a planar representation of parity space indicating the meaning of vectors in parity space.

Given the definition of matrix V, in particular equation (9) which defines an upper triangular matrix, the first column has only a single non-zero element $V_{11}$ and thus can be easily assigned to the X-axis. Thus, in FIG. 3, the sensor signal provided by sensor number 1 is assigned to the X-axis 130. The matrix elements in the sensor signals from sensors 2 and 3 are thus displayed along axes 140 and 150 forming $+120°$ and $-120°$ angles with the positive X-axis, respectively. The angle $\phi$ formed between vector 155 and the X-axis 130 identifies the constituent sensors. If the angle $\phi$ is greater than zero and less than 60°, then the parity vector signal of DC drift signal will include a sensor signal from sensor number 1 with a positive deviation from the average and a sensor signal from sensor number 3 with a negative deviation, as illustrated in FIG. 3. Similarly, positive values of angle $\phi$ between 60° and 120°, and 120° and 180° result in constituent sensors 2 and 3, and 1 and 2, respectively, while negative values of $\phi$ between 0° and $-60°$, $-60°$ and $-120°$, and $-120°$ and $-180°$ have corresponding constituent sensors 1 and 2, 2 and 3, and 1 and 3, respectively, as illustrated in FIG. 3.

After the constituent sensors have been identified, sensor DC drift signals can be found for each of the constituent sensors using geometric and trigonometric relationships. The case of three measurements of a scalar parameter will be used. Two examples of the computational methods will be given, but it is should be understood that others are possible. In the first method, it is noted that the measurement axis 150 of sensor #3 is defined by $y=\sqrt{3}\,x$ (see the third column of matrix in equation (14)), while $y=-\sqrt{3}\,x$ defines the measurement axis 140 of sensor #2. In four out of the six regions defined in FIG. 3, sensor #1 is a constituent sensor and the sensor #1 DC drift can easily be found by finding the X-intercept of a line 160 (FIG. 1) parallel to the measurement axis of the other constituent sensor (#2 or #3). The other sensor (#2 or #3) DC drift has a Y-coordinate equal to the Y-coordinate of the composite DC drift and its X-coordinate can be found by solving the appropriate equation above defining the measurement axis for that sensor. Thus, the component DC drift signals 210 and 220 in FIG. 1 can be easily found.

In the case of a composite DC drift signal in a region in which the constituent sensors are 2 and 3, calculation of the component DC drift signals is slightly more difficult, but the same principles are involved. See for example, the composite DC drift vector 155' in FIG. 3 in a region having constituent sensors #2 and #3.

A second method of calculating sensor DC drift signals utilizes the residual signals corresponding to each of the sensors. As noted above, the projection along each of the measurement axes is defined by equation (17). However, $\sqrt{1/(1-1)}$ is simply a scale factor which puts calculations using the residuals into the same scale as those using matrix V, defined in equation (14). It is possible to perform the calculations directly on residuals $\eta_j$ and multiply by the scale factor $\sqrt{1/(1-1)}$ at a later time or perform scaling using some other factor.

With reference to FIG. 3, the coordinates of the vector 155' representing composite DC drift and the sensor #2 and sensor #3 DC drift signals represented by vectors 220' and 230' can be calculated from the projections $p_j$ along the measurement axes, as defined by equation (17). By definition, a line 170 between the tip of the DC drift vector 10' and the tip $p_3$ of the projection along the sensor #3 measurement axis 150 forms an angle of 30° with the measurement axis 130, since the smallest angle between all of the measurement axes if 60°. Therefore, $X=-p_3/\sin 30°$. The X-coordinate $X_{DC}$ equals the projection $p_1$ along the sensor #1 measurement axis 130 and the Y-coordinate $Y_{DC}$ of the composite DC vector 10' is defined by equation (24).

$$Y_{DC}=(p_1-X)\tan 30° \tag{24}$$

The sensor #2 and #3 DC drift signals represented by vectors 220' and 230' can be calculated from the composite DC drift vector 155' utilizing the parallelogram having sides formed by vectors 220' and 230' and having a major diagonal formed by vector 155', together with the triangle defined by the tips of vectors 155', 220' and $p_3$. The distance D between $p_3$ and the tip of vector 10' can be found by vector subtraction or as $D=p_3 \cos\theta$, where $\theta=120°-\arctan Y_{DC}/X_{DC}$. Thus, the sensor #2 DC drift signal $DC_2=-D/\sin 60°$ and the sensor #3 DC drift signal $DC_3=p_3-DC_2 \cos 60°$. When one of the consituent sensors of the composite DC drift signal is sensor #1, the sensor DC drift signals are easily calculated. For example, the sensor #1 and #3 DC drift signals $DC_3$ and $DC_1$ represented by vectors 210 and 220 (FIG. 1), respectively, are found as $DC_3=-Y_{DC}/\sin 60°$ and $DC_1=X_{DC}+DC_3 \cos 60°$.

Increased sensitivity to sudden changes in DC drift can be provided according to the present invention by weighting the average which produces the centroid 120. Such weighting is provided by equation 25, where $\overline{X}_{i,j}$ is the weighted running average for sensor direction i of the parity vector in the jth sample of the sensor signals, $(1-W)$ is a weighting coefficient in which W is a weighting function and $X_{i,j}$ is the sensor #i parity vector signal for in the jth sample. The weighting function W may, for example, be 0.01 or 0.02, representing an average over the last 100 to 50 samples, respectively.

$$\overline{X}_{i,j} = (1-W)\overline{X}_{i,j-1} + W \cdot X_{i,j} \quad (25)$$

Equation (25) represents first order lag, but other equations may be used to provide a desired response, representing, e.g., second order lag, for recent samples of the sensor signals, as is known the art. Other variations are also possible. For example, the parity vector can be averaged in two dimensions and periodically (e.g., every 50 or 100 samples) the sensor components can be calculated, as described above.

Figure 5:
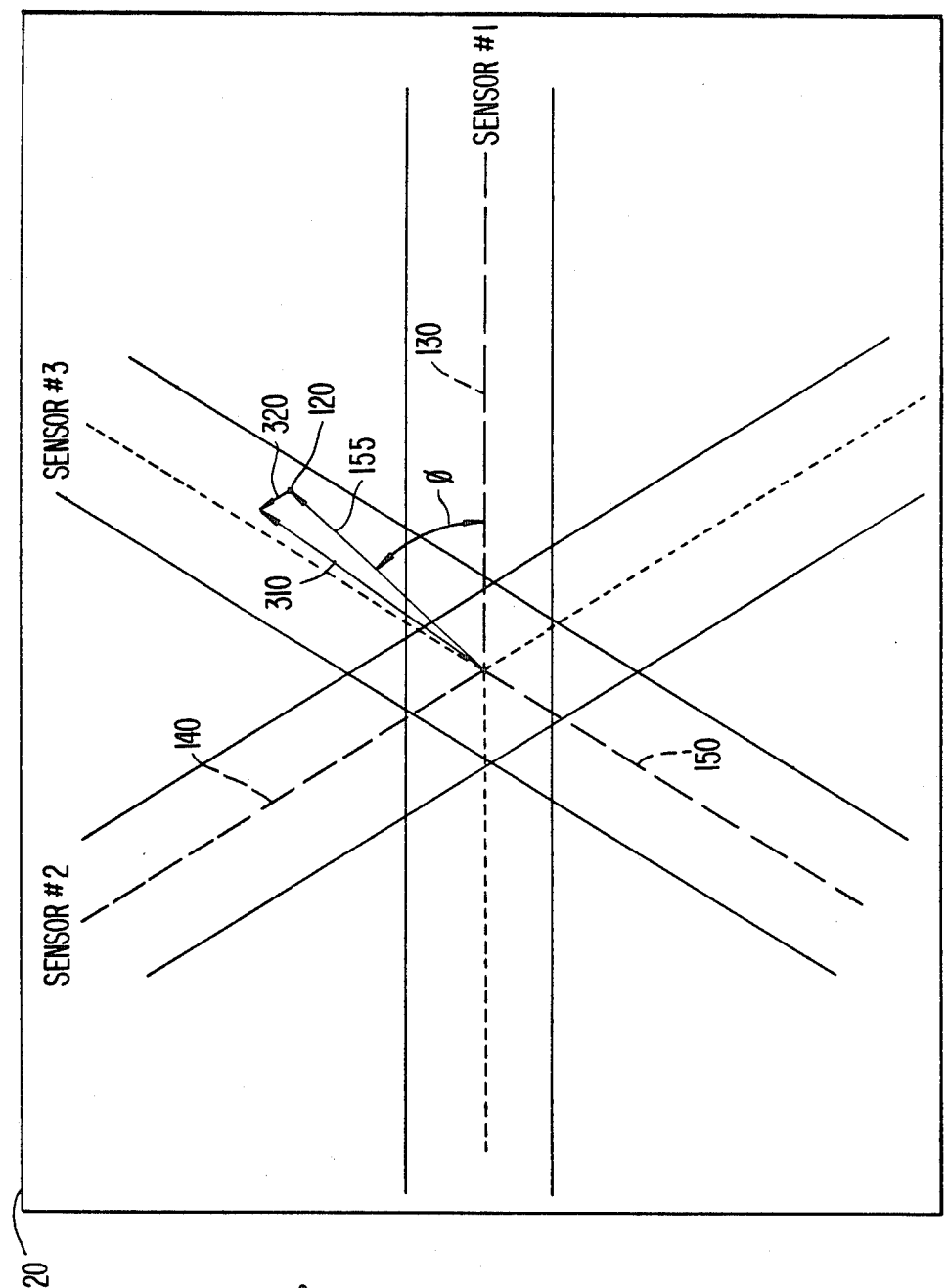
FIG. 5, is a planar representation of parity space illustrating calculation of a composite noise vector.

As noted above, noise on lines 40 (FIG. 2) cause fluctuations in the parity vector corresponding to the sample of the sensor signals. Thus, in a recent sample of the sensor signals, a parity vector 310 (FIG. 5) may be produced having coordinates which are different from the coordinates of the composite DC drift vector 155. Using standard vector arithmetic, a composite instaneous noise signal can be calculated and represented by vector 320.

Figure 6:
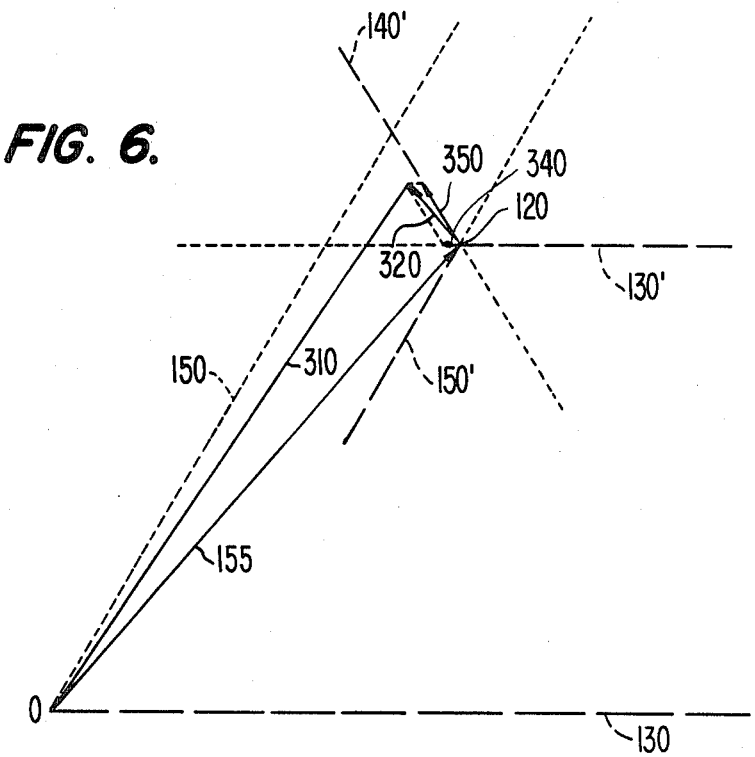
FIG. 6, is a planar representation of a region in parity space illustrating calculation of sensor noise vectors.

The composite instaneous noise signal has sensor instaneous noise signals corresponding to constituent sensors. A magnified drawing of the region on display screen 20 bounded by positive values of sensor #1 and negative values of sensor #3 is illustrated in FIG. 6. Component instaneous noise signals corresponding to constituent sensors and represented by vectors 340 and 350 can be found by transposing the axes 130, 140 and 150 to the centroid 120 to produce a coordinate system for noise signals defined by axes 130', 140' and 150', corresponding to sensors #1, #2 and #3, respectively. After the constituent sensors of the noise signal 230 are identified, the sensor instaneous noise signals represented by vector 340 and 350 can be found using the same methods used to find the sensor DC drift signals.

The average amount of noise in each sensor signal can be found using a weighted RMS average of the RMS instaneous noise signals. Thus, a sensor noise signal $\overline{N}^2_{k,j}$ can be calculated using standard matrix arithmetic and equation (26), where $\overline{N}^2_{k,j}$ is the sensor noise signal for sensor number k in the jth sample of the sensor signals, $W_n$ is a weighting function for noise signals which may or may not be the same as the weighting function W for DC drift signals, $\hat{X}_j$ is the parity vector signal for the jth sample of the sensor signals, $\hat{\overline{X}}_j$ is the direct current drift vector, and $\hat{k}$ is a unit vector along the axis for sensor number k.

$$\overline{N}^2_{k,j} = (1-W_n)\overline{N}^2_{k,j-1} + W_n[(\hat{X}_j - \hat{\overline{X}}_j) \cdot \hat{k}]^2 \quad (26)$$

Figure 2:
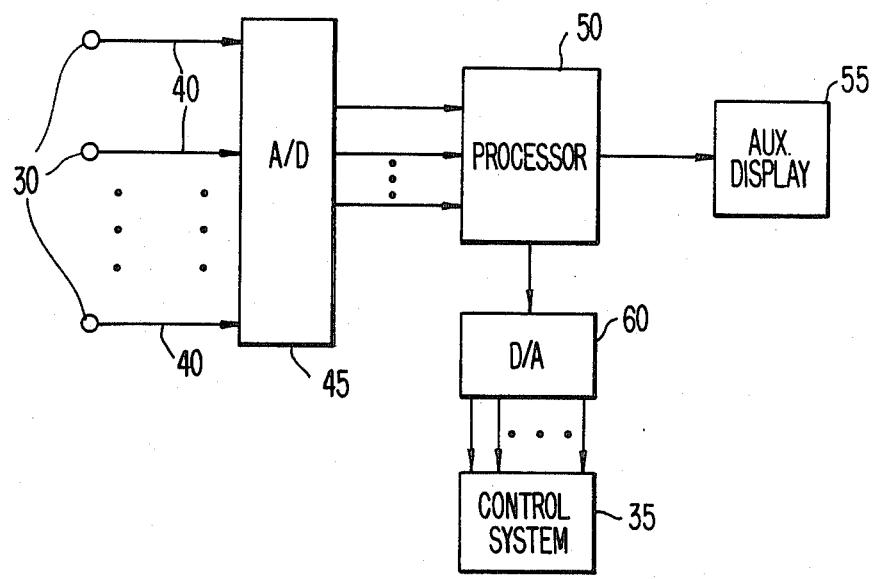
FIG. 2 is a block diagram of an apparatus to which the present invention can be applied.

The lines parallelling each of the axes 130, 140 and 150 in FIGS. 1 and 2 indicate the error bounds of each of the sensors. In the above example, it has been assumed that the error bound for each of these sensor signals is the same and has a value of b, as used in equations (4), (5a), (5b) and (9). However, it is possible for the error bounds of the sensors to differ and this can be taken into account in the parity-space algorithm.

The many features and advantages of the present invention are apparent from the detailed specification, and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described, accordingly, all suitable modifications and equivalents may be resorted to falling within the scope and spirit of the invention.

What is claimed is:

1. A method of measuring direct current drift and noise in samples of sensor signals received from corresponding sensors, comprising the steps of:
    (a) converting the samples of the sensor signals into parity vector signals, each parity vector signal representing inconsistency among a corresponding sample of the sensor signals at a point in time;
    (b) converting the parity vector signals into a direct current drift signal indicating direct current drift of the sensor signals by producing a first running average of the parity vector signals; and
    (c) producing an instantaneous noise signal for a corresponding parity vector signal by subtracting the direct current drift signal from the corresponding parity vector signal.

2. A method as recited in claim 1, wherein step (b) comprises the step of:
    (bi) identifying constituent sensors of the direct current drift signal; and
    (bii) converting the direct current drift signal into sensor direct current drift signals corresponding to the constituent sensors.

3. A method as recited in claim 2, further comprising the steps of:
    (d) converting the instantaneous noise signal into component instantaneous noise signals, each component instantaneous noise signal representing noise in one of the sensor signals; and
    (e) converting the parity vector signals into sensor noise signals by producing second running averages of the component instantaneous noise signals.

4. A method as recited in claim 1, wherein step (b) comprises the steps of:
    (bi) converting a recent parity vector signal, produced after prior parity vector signals, into component parity vector signals;
    (bii) calculating sensor direct current drift signals for the samples of the sensor signals by producing component first running averages, each component first running average corresponding to one of the component parity vector signals;
    (biii) multiplying the component first running averages, which exclude the recent parity vector signals and include all the prior parity vector signals, times a weighted coefficient to produce weighted prior averages, corresponding to the component parity vectors; and
    (biv) summing the weighted prior averages and the component parity vector signals of the recent parity vector signal to produce the component first running averages.

5. A method as recited in claim 1,
    wherein the instantaneous noise signal comprises instantaneous sensor noise signals, each instantaneous sensor noise signal representing instantaneous noise in one of the sensor signals, and
    wherein said method further comprises the step of (d) converting the parity vector signals into average sensor noise signals by producing second running averages of the instantaneous sensor noise signals.

6. A method as recited in claim 5, wherein step (d) comprises the steps of:
    (di) identifying constituent sensors of the instantaneous noise signal corresponding to a recent parity vector signal which is produced after prior parity vector signals;

(dii) subtracting a first weighting coefficient from 1 to produce a second weighting coefficient;

(diii) multiplying the second weighting coefficient times the second running averages, which exclude the recent parity vector signal and include all the prior parity vector signals, to produce weighted average signals, corresponding to each of the constituent sensors;

(div) subtracting the first running average, which includes only the recent parity vector signal and all the prior parity vector signals, from the recent parity vector signal to produce the instantaneous noise signal;

(dv) squaring each of the component instantaneous sensor noise signals to produce squared instantaneous sensor noise signals, corresponding to each of the constituent sensors; and (dvi) summing the weighted average signals with the squared instantaneous sensor noise signals multiplied by the first weighting coefficient to produce the second running averages, corresponding to each of the constituent sensors.

7. A method of measuring direct current drift and noise in samples of sensor signals received from l corresponding sensors, comprising the steps of:

(a) converting each sample of the sensor signals into an average measurement signal by summing the sensor signals and dividing by l;

(b) converting the sensor signals into residual signals by subtracting the average measurement signal from each of the sensor signals, at least one of the residual signals being a smallest residual signal;

(c) converting the residual signals into l−1 component parity vector signals of a parity vector;

(d) converting the component parity vector signals into a direct current drift signal by producing first running averages of the component parity vector signals, respectively, for each of the samples; and (e) subtracting the direct current drift signal from the parity vector to produce instantaneous sensor noise signals for each sample of the sensor signals.

8. A method as recited in claim 7, further comprising the steps of:

(f) identifying constituent sensors of the direct current drift signal produced from a recent sample of the sensor signals;

(g) converting the direct current drift signal into sensor direct current drift signals, corresponding to each of the constituent sensors.

9. A method as recited in claim 7, wherein step (d) comprises the steps of:

(di) multiplying the first running averages, produced immediately prior to a recent sample, times a weighted coefficient to produce weighted prior averages, respectively, for each of the component parity vector signals; and (dii) summing the weighted prior averages and component parity vector signals to produce the first running averages, respectively.

10. A method as recited in claim 7, further comprising the step of (f) converting the instantaneous sensor noise signals into average sensor noise signals by producing second running averages of the instantaneous sensor noise signals, respectively.

11. A method as recited in claim 10, wherein step (e) comprises the steps of:

(ei) identifying constituent sensors corresponding to the instantaneous sensor noise signals produced for a recent sample of the sensor signals;

(eii) subtracting the direct current drift signal, produced for the recent sample of the sensor signals, from the parity vector, produced from the recent sample of the sensor signals, to produce a composite instantaneous noise signal; and (eiii) converting the composite instantaneous noise signal into the instantaneous sensor noise signals, corresponding to the constituent sensors;

wherein step (f) comprises the steps of:

(fi) subtracting a first weighting coefficient from 1 to produce a second weighting coefficient;

(fii) multiplying the second weighting coefficient times the second running averages, produced immediately prior to the recent sample of the sensor signals, to produce weighted average signals corresponding to the constituent sensors;

(fiii) squaring each of the instantaneous sensor noise signals to produce squared instantaneous sensor noise signals, corresponding to each of the constituent sensors; and (fiv) summing the weighted average signals with the squared instantaneous sensor noise signals multiplied by the first weighting coefficient to produce the second running averages, corresponding to each of the constituent sensors.

12. A method of measuring direct current drift and noise in samples of sensor signals received from corresponding sensors in a pressurized light water nuclear reactor system, comprising the steps of:

(a) converting each sample of the sensor signals into an average measurement signal $\overline{m}$ in accordance with:

$$\overline{m} = \frac{1}{l} \sum_{i=1}^{l} m_i,$$

where $m_i$ is one of the samples of one of the sensor signals;

(b) converting the sensor signals into residual signals $\eta_i$ in accordance with $\eta_i = m_i - \overline{m}$, at least one of the residual signals being a smallest residual signal $\eta_1$;

(c) converting the residual signals $\eta_i$ into component parity vector signals of a parity vector $X_j$;

(d) converting the component parity vector signals into a direct current drift signal $\overline{X}_j$ in accordance with:

$$\overline{X}_j = (1-W)\overline{X}_{j-1} + WX_j,$$

where $W$ is a first weighting coefficient;

(e) identifying constituent drift sensors of the direct current drift signal;

(f) converting the direct current drift signal $\overline{X}_j$ into sensor direct current drift signals, corresponding to the constituent drift sensors;

(g) producing a composite instantaneous noise signal $N_j$ in accordance with $N_j = X_j - \overline{X}_j$;

(h) identifying constituent noise sensors of the composite instantaneous noise signal $N_j$;

(i) converting the composite instantaneous noise signal $N_j$ into instantaneous sensor noise signals $N_{i,j}$ corresponding to the constituent noise sensors; and (j) converting the instantaneous sensor noise signals $N_{i,j}$ into average sensor noise signals $\overline{N}^2{}_{i,j}$ in accordance with:

$$\overline{N}^2{}_{i,j} = (1 - W_n)\overline{N}^2{}_{i,j-1} + W_n N^2{}_{i,j},$$

where $W_n$ is a second weight coefficient.

13. A method as recited in claim 12, wherein l is equal to three and the constituent drift and noise sensors have a maximum number of two for each of the samples of the sensors in the pressurized light water nuclear reactor system.

* * * * *